United States Patent
Leigh et al.

(10) Patent No.: US 10,459,172 B1
(45) Date of Patent: Oct. 29, 2019

(54) ADAPTER RETENTION MECHANISMS

(71) Applicant: HEWLETT PACKARD ENTERPRISE DEVELOPMENT LP, Houston, TX (US)

(72) Inventors: Kevin B. Leigh, Houston, TX (US); Paul K. Rosenberg, Sunnyvale, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/964,419

(22) Filed: Apr. 27, 2018

(51) Int. Cl.
*G02B 6/36* (2006.01)
*G02B 6/38* (2006.01)

(52) U.S. Cl.
CPC ......... *G02B 6/3882* (2013.01); *G02B 6/3834* (2013.01); *G02B 6/3855* (2013.01); *G02B 6/3897* (2013.01)

(58) Field of Classification Search
CPC .. G02B 6/3885; G02B 6/3893; G02B 6/3887; G02B 6/3825; G02B 6/3821; G02B 6/36
See application file for complete search history.

(56) References Cited

U.S. PATENT DOCUMENTS

| | | | |
|---|---|---|---|
| 5,600,748 A | 2/1997 | Kosaka | |
| 6,840,680 B1 | 1/2005 | Chiu et al. | |
| 8,068,715 B2 | 11/2011 | Kewitsch | |
| 8,111,966 B2 * | 2/2012 | Holmberg | G02B 6/3897 385/135 |
| 8,768,116 B2 | 7/2014 | McColloch | |
| 9,507,099 B2 | 11/2016 | Li | |
| 9,798,091 B2 * | 10/2017 | Samal | G02B 6/3809 |
| 2008/0248683 A1 | 10/2008 | Kim et al. | |
| 2012/0329320 A1 | 12/2012 | Taylor et al. | |

FOREIGN PATENT DOCUMENTS

| | | |
|---|---|---|
| JP | 09-102364 A | 4/1997 |
| WO | 2017/081300 A1 | 5/2017 |

OTHER PUBLICATIONS

"HBMT™ MT High-Density Optical Backplane Connector System", HBMT™ MT HighDensity Optical Backplane Connector System Molex, Retrieved from Internet Jul. 7, 2017, www.molex.com/molex/products/family?key=hbmt_mt_high_density_backplane_interconnect_system&channel=products&chanName=family&pageTitle=Introduction&parentKey=backplane products >.

(Continued)

*Primary Examiner* — Jennifer Doan
(74) *Attorney, Agent, or Firm* — Nolte Intellectual Property Law Group

(57) ABSTRACT

An adapter retention mechanism including an adapter body having a first end and a second end, the first and second ends accepting first and second sets of ganged ferrules in use; a first pair of closure members pivotably connected to the first end of the adapter body, the first pair of closure members comprising first and second locking mechanisms, the first pair of closure members being configured to engage the first set of ganged ferrules; and a second pair of closure members pivotably connected to the second end of the adapter body, the second pair of closure members comprising third and fourth locking mechanisms, the second pair of closure members being configured to engage the second set of ganged ferrules.

20 Claims, 13 Drawing Sheets

(56) References Cited

OTHER PUBLICATIONS

"HD-optyx,"ATCS Connector Type: Orthogonal | ATCS Products: HDOptyx™ | ATCS Connector Type: Mezzanine | Search for airmax | Amphenol TCS, Sep. 29, 2016, <https://www.amphenol-tcs.com/search.php?n=orth+hdoptyx+mezz&q=airmax&srt=rel >.
International Search Report and Written Opinion received for PCT Application No. PCT/US2019/029699, dated Aug. 23, 2019, 11 pages.

\* cited by examiner

US 10,459,172 B1

ADAPTER RETENTION MECHANISMS

STATEMENT OF GOVERNMENT RIGHTS

This invention was made with Government support under Prime Contract No. DE-AC52-07NA27344 awarded by DOE. The Government has certain rights in this invention.

BACKGROUND

Increasingly complex computer infrastructure is commonly used to perform computing tasks. Data centers are often used to manage this computing infrastructure. Such data centers may include various electronic devices that make up the computing infrastructure. To facilitate the transmission of data through the computing infrastructure, many devices including, for example, external optical cables, patch panels and fiber shuffle boxes are used to implement complex connection topologies for computing systems. The connections between the different devices in the computing infrastructure may have different types of connections, which may change over time as devices are upgraded, added, or services.

DETAILED DESCRIPTION

Figure 1:
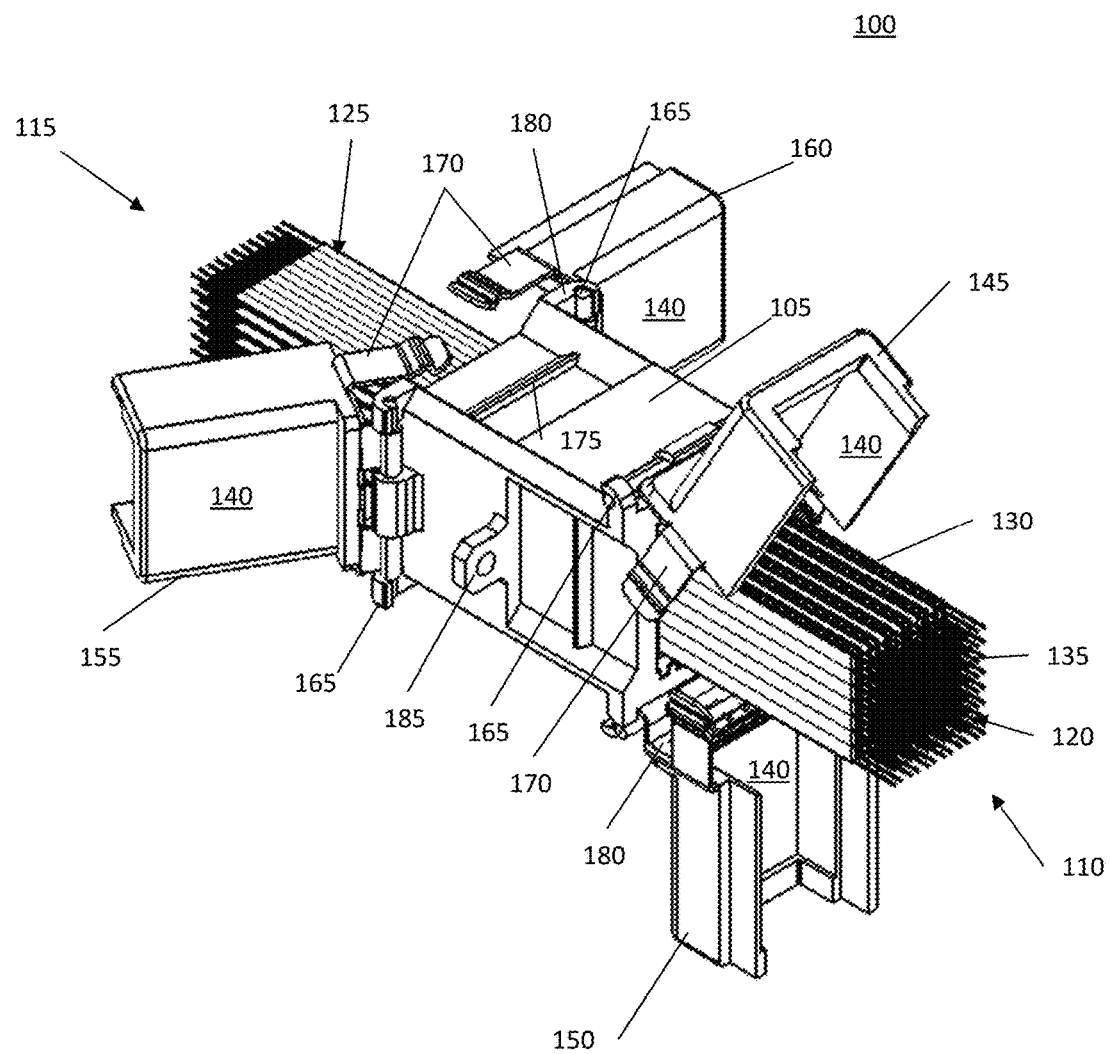
FIG. 1 shows a top perspective view of an adapter in an open position in accordance with one or more embodiments.

One or more embodiments of the subject matter claimed below are described in detail with reference to the accompanying figures. For consistency, like elements in the various figures are denoted by like reference numerals. In the following detailed description, specific details are set forth in order to provide a thorough understanding of the example embodiment. In other instances, well-known features to one of ordinary skill in the art are not described to avoid obscuring the description of the example embodiment.

Optical fiber shuffles are used to provide complex connectivity among multiple computers, computer systems, and/or networks. Optical fibers from each optical connector of a system are separated to optically couple to multiple optical connectors of different systems. Fiber shuffles can be expensive, have a long lead time to implement, and can by physically larger than is desirable.

The present disclosure provides retention mechanisms for optical fiber shuffles achieved through adapters that retain orthogonally or parallel mated ferrules. The adapters using such retention mechanisms may provide apparatuses and methods for retaining ganged-ferrules, securing the ganged-ferrules into place within the adapter, and providing a secure optical connection that is inexpensive, easy to implement and may have a desirable form factor internally or externally of systems.

Turning to FIG. 1, a top perspective view of an adapter 100 in an open position is shown. In this embodiment, an adapter 100 is shown having an adapter body 105 that has a first end 110 and a second end 115. Adapter body 105 is configured such that the first end 110 may receive a first set 120 of ganged ferrules 130, while the second end 115 may receive a second set 125 of ganged ferrules 130. As used herein, the first and second sets 120, 125 of ganged ferrules 130 may include one or more ferrules 130 into which one or more optical fibers 135 may be inserted. Those of ordinary skill in the art will appreciate that the first and second sets 120, 125 of ganged ferrules 130 may include, for example, one, two, three, four, five, six, seven or more ferrules 130 in either a single-row or a dual-row fiber configuration. As such, each set 120, 125 of ganged ferrules 130 may provide support for connecting one or more optical fibers 135.

Adapter 100 may further include a closure member 140, which in this embodiment is illustrated as a first lid 145, disposed on the first end 110. Adapter 100 may further include a second closure member 140, which is illustrated as a second lid 150, disposed on the first end 110. Similarly, adapter 100 may include two additional closure members 140, which in this embodiment are illustrated as third lid 155 and fourth lid 160, disposed on the second end 115.

First, second, third, and fourth lids 145, 150, 155, 160 may be pivotably connected to adapter body 105 using multiple pivot points 165. Pivot points 165 may include hinges, pins, coextruded connections or any other physical structure that provides a central point on which the lids 145, 150, 155, 160 rotate relative to adapter body 105. In certain embodiments lids 145, 150, 155, 160 may be connected or disconnected at pivot point 165 by removal of a pin or other structure, thereby allowing lids 145, 150, 155, 160 to be changed or otherwise adapted for use with particular adapters 100. In some other examples, a pin in a pivot point 165 may be provisioned to be tightened, for example to retain a closed lid.

First, second, third, and fourth lids 145, 150, 155, 160 may also include retention clips 170. In this embodiment, lids 145, 150, 155, 160 each include two opposing retention clips 170 that are configured to engage or otherwise interact with adapter body 105. While two opposing retention clips 170 are illustrated for each lid 145, 150, 155, 160, in other embodiments, a single retention clip 170 or more than two retention clips 170 may be used for each lid 145, 150, 155, 160. In still other embodiments, a single retention clip 170 may be used for each set of corresponding lids 145, 150, 155, 160. For example, first and second lids 145, 150 may have a single retention clip 170, while third and fourth lids 155, 160 have a single retention clip.

The retention clips 170 of lids 145, 150, 155, 160 are configured to engage or otherwise interact with adapter body 105. Retention clips 170 may thereby provide a locking mechanism that holds lids 145, 150, 155, 160 in place when adapter 100 is in the closed position. In this embodiment, the retention clips 170 are configured to engage a retention surface 175 disposed on adapter body 105. As illustrated, retention surface 175 may include a raised portion on adapter body 105 that the retention slips 170 slide over, thereby holding the retention clips 170 to the adapter body 105 until a positive force is applied to the retention clips 170, thereby releasing them from the adapter body 105. In other embodiments, positive forces may have to be applied to the top, side, or bottom of retention clips 170 in order to allow the lids 145, 150, 155, 160 to be retracted into the open position.

While retention surface 175 is illustrated herein as a raised surface, in other embodiments the retention surface 175 may include a raised surface with an orifice therein through which the retention clips may slide and be secured in place. Those of ordinary skill in the art having the benefit of this disclosure will appreciate that various alternative physical structures may be provided on adapter body 105 to releasably secure the retention clips 170 thereto. In certain embodiments, retention surface 175 may be an integral element of adapter body 105, such as when the retention surface 175 is formed when the adapter body 105 is formed. In other embodiments, retention surface 175 may be added after adapter body 105 is formed, thereby allowing retention surfaces 175 to be added to existing adapter bodies 105. In such embodiments, retention surfaces 175 may be adhesively or mechanically connected to adapter body 105, thereby allowing the retention surface 175 to be modular with respect to the various aspects of adapter 100.

First, second, third, and fourth lids 145, 150, 155, 160 also include a base 180 disposed on an internal end thereof. When in a closed position, base 180 may provide a positive force, or retention force, thereby pressing and holding the ganged ferrules 130 in place within adapter body 105. Base 180 may include the end surface of lids 145, 150, 155, 160 or may include a raised surface that is not flush with the ends of lids 145, 150, 155, 160. In certain embodiments, base 180 may include a profile that is configured to engage a matching profile on ganged ferrules 130 in a manner not shown.

Adapter 100 may further include one or more mounting features 185 disposed on adapter body 105. As illustrated, mounting features 185 may be low profile features, thereby preventing the mounting features 185 from interfering with the mounting of the adapter 100 to desired locations. Mounting features 185 may provide an attachment point for the adapter 100, thereby allowing adapter 100 to be removably connected to a housing or rack (not shown) or to other adapters (not independently shown). As illustrated, mounting feature 185 includes a holed bracket configuration, thereby allowing adapter 100 to be attached to other features with a screw, securing adapter 100 in place until the adapter 100 is further accessed.

In other embodiments, rather than a holed bracket configuration, mounting features may include one or more of clips, springs, tie-down points, adhesives, or other physical and/or chemical connections that allow adapter 100 to be secured to another feature. Additionally, accordingly to certain aspects of the adapter 100, mounting features 185 may be disposed at one or more points around adapter body 105. For example, a single mounting feature 185 may be disposed on a single side of adapter body 105, multiple mounting features 185 may be disposed on a single side of adapter body 105, or one or more mounting features 185 may be disposed on more than one side of adapter body 105.

Figure 2:
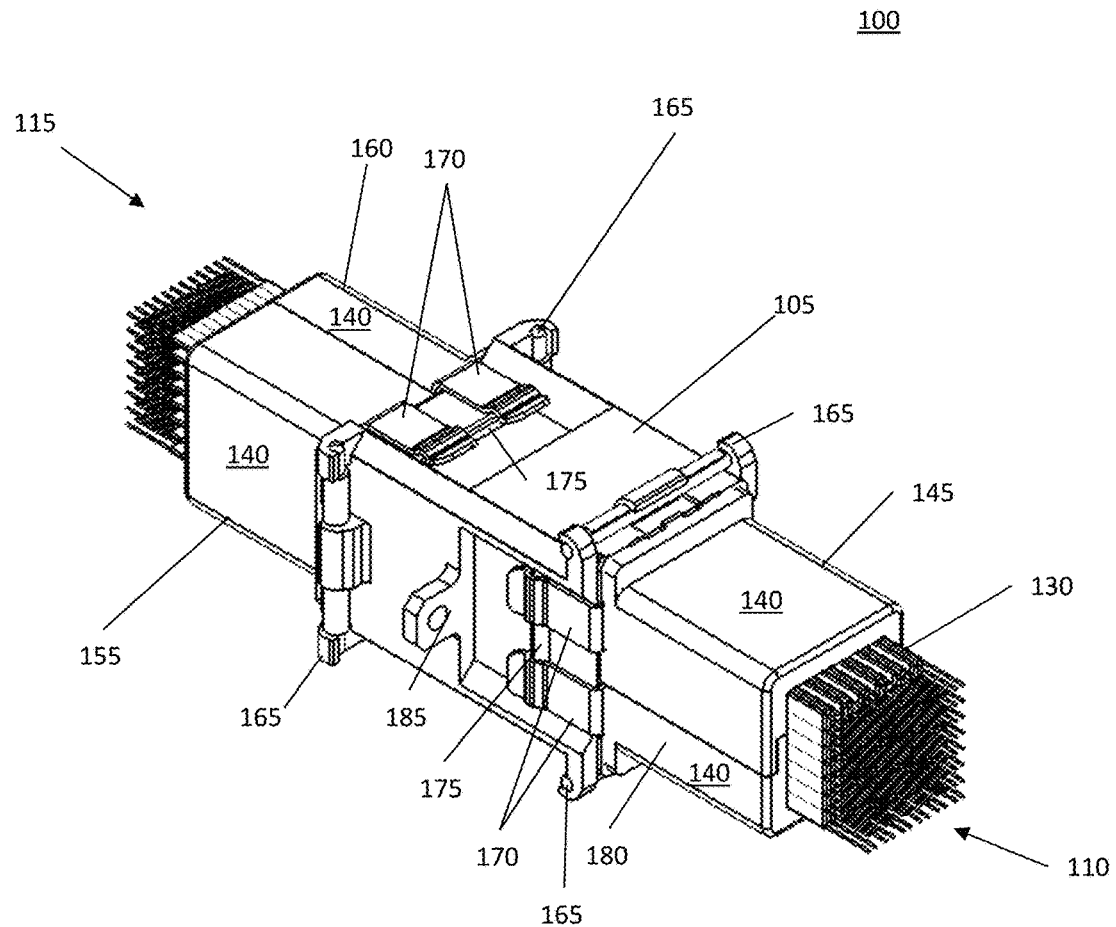
FIG. 2 shows a top perspective view of the adapter of FIG. 1 in a closed position.

Referring to FIG. 2, the lids 145, 150, 155, 160 are pivotably connected to adapter body 105 at pivot points 165 as discussed above. As such, lids 145, 150, 155, 160 may be rotated from the open position shown in FIG. 1 into the closed position, as shown in FIG. 2. When in the closed position, retention clips 170 of lids 145, 150, 155, 160 engage the retention surface 175 on adapter body 105. In this embodiment, the retention clips 170 may be pushed over the top of retention surface 175 and the retention surface 175 may prevent lids 145, 150, 155, 160 from retracting into the open position unless a positive force is applied to the ends of the retention clips 170. In other embodiments, positive forces may have to be applied to the top, side, or bottom of retention clips 170 in order to allow the lids 145, 150, 155, 160 to be retracted into the open position.

Additionally, when in the closed position, the base 180, shown in FIG. 1, may provide a positive force on one or more ferrules 130 holding one or more optical fibers 135. The positive force applied by the base 180 to the ferrules 130 may thereby hold the ferrules 130 in place when the adapter 100 is in the closed position. Because the retention clips 170 hold lids 145, 150, 155, 160 closed, the positive force on the ferrules 130 may be maintained, thereby preventing one or more ferrules 130 from backing out or otherwise coming unintentionally disconnected.

Adapter 100 may further include one or more mounting features 185 disposed on adapter body 105. As explained above with respect to FIG. 1, mounting features 185 may provide an attachment point for the adapter 100, thereby allowing adapter 100 to be removably connected to a housing or rack (not shown) or to other adapters (not independently shown). Additionally, because lids 145, 150, 155, 160 hold adapter in the closed position adapters 100 may be secured more closely, thereby allowing for more adapters in a single system.

Figure 3:
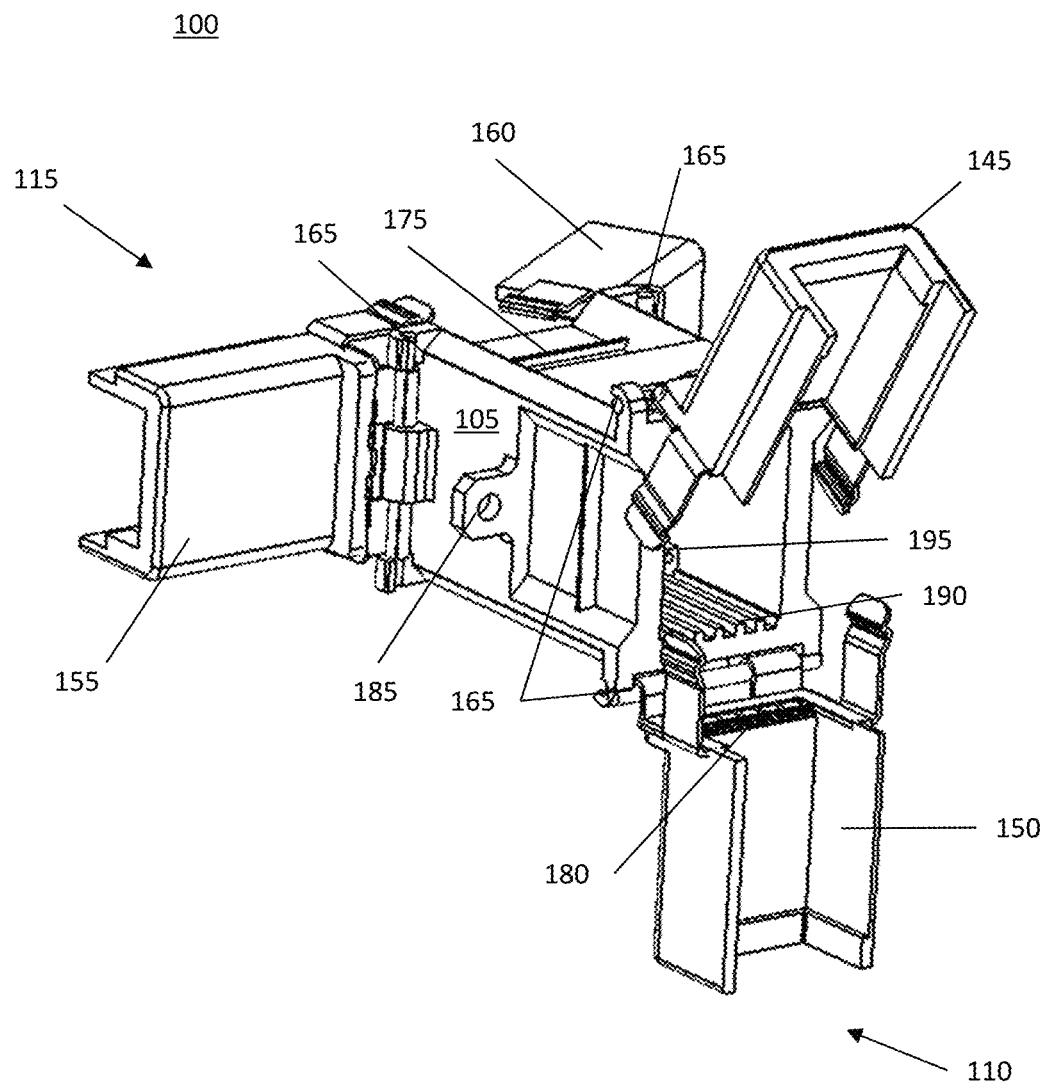
FIG. 3 shows a perspective view of the adapter of FIG. 1-FIG. 2 in an open position from a different angle.

Referring to FIG. 3, a perspective view of the adapter 100 in an open position is shown from a different angle. FIG. 3 shows adapter 100 in an open position prior to the sets 120, 125 (shown in FIG. 1) of ganged ferrules 130 from being inserted therein. As explained above with respect to FIGS. 1 and 2, adapter 100 includes an adapter body 105 having a first end 110 and a second end 115 and also having a retention surface 175 disposed or otherwise formed thereon. Adapter body 105 further includes a series of ferrule guides 190, thereby allowing the first and second sets 120, 125 of ganged ferrules 130 to be inserted into adapter body 105 and guided into position for initial alignment. Furthermore, adapter body 105 may include one or more final alignment features 195, which may facilitate aligning the first and second sets 120, 125 of ganged ferrules 130 into the correct orientation and final position during assembly.

The adapter 100 also includes first, second, third, and fourth lids 145, 150, 155, and 160, as well as pivot point 165 and mounting features 185 as discussed in detail with respect to FIG. 1 and FIG. 2.

Figure 4:
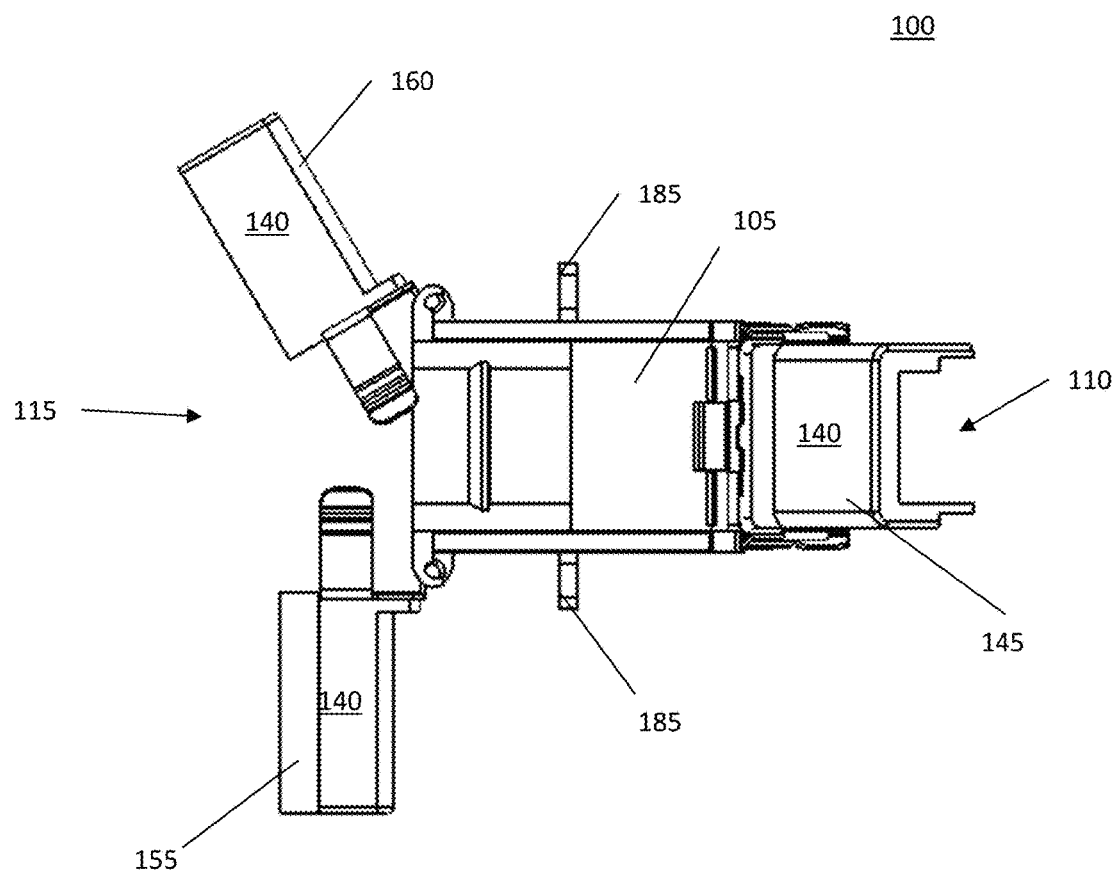
FIG. 4 shows a side view of the adapter of FIG. 1-FIG. 3 in an open position.

Referring to FIG. 4, a side view of an adapter 100 in an open position according to one particular example embodiment. Two mounting features 185 are shown on opposite sides of adapter body 105. In other embodiments, mounting features 185 may be disposed at one or more points around adapter body 105. For example, a single mounting feature 185 may be disposed on a single side of adapter body 105, multiple mounting features 185 may be disposed on a single side of adapter body 105, or one or more mounting features 185 may be disposed on more than one side of adapter body 105.

Figure 5:
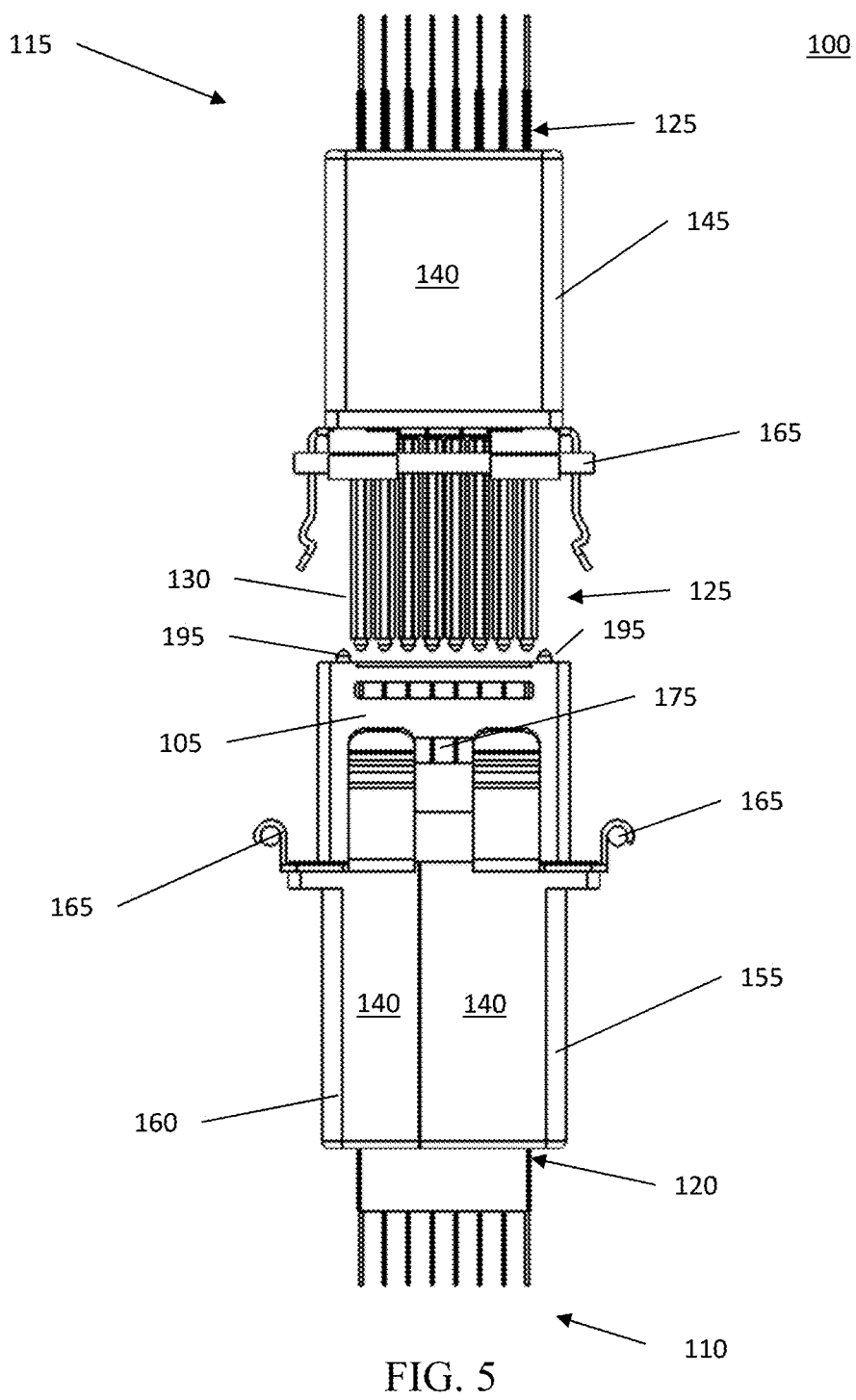
FIG. 5 shows a top view of the adapter of FIG. 1-FIG. 4.

Referring to FIG. 5, a top view of the adapter 100 is shown. FIG. 5 shows adapter 100 in a closed position, where the second end 115 is partially cutaway so that the second set of ganged ferrules 125 is viewable through the side of adapter body. As shown, adapter body 105 may include one or more final alignment features 195, which may facilitate aligning the first set 120 of ganged ferrules 130 and the second set 125 of ganged ferrules 130 into the correct orientation and in final position during assembly. In FIG. 5, the first and second lids 145, 150 are holding in place the first set 120 of ganged ferrules 130, which is illustrated as a 6-ganged ferrule set in which only the first ferrule 130 is visible. The third and fourth lids 155, 160 hold in place the second set of ganged ferrules 125, which is illustrated as an 8-ganged ferrule set. In other examples, the first set 120 and second set 125 of ganged ferrules 130 may have different counts than 6 and 8, respectively.

Figure 6:
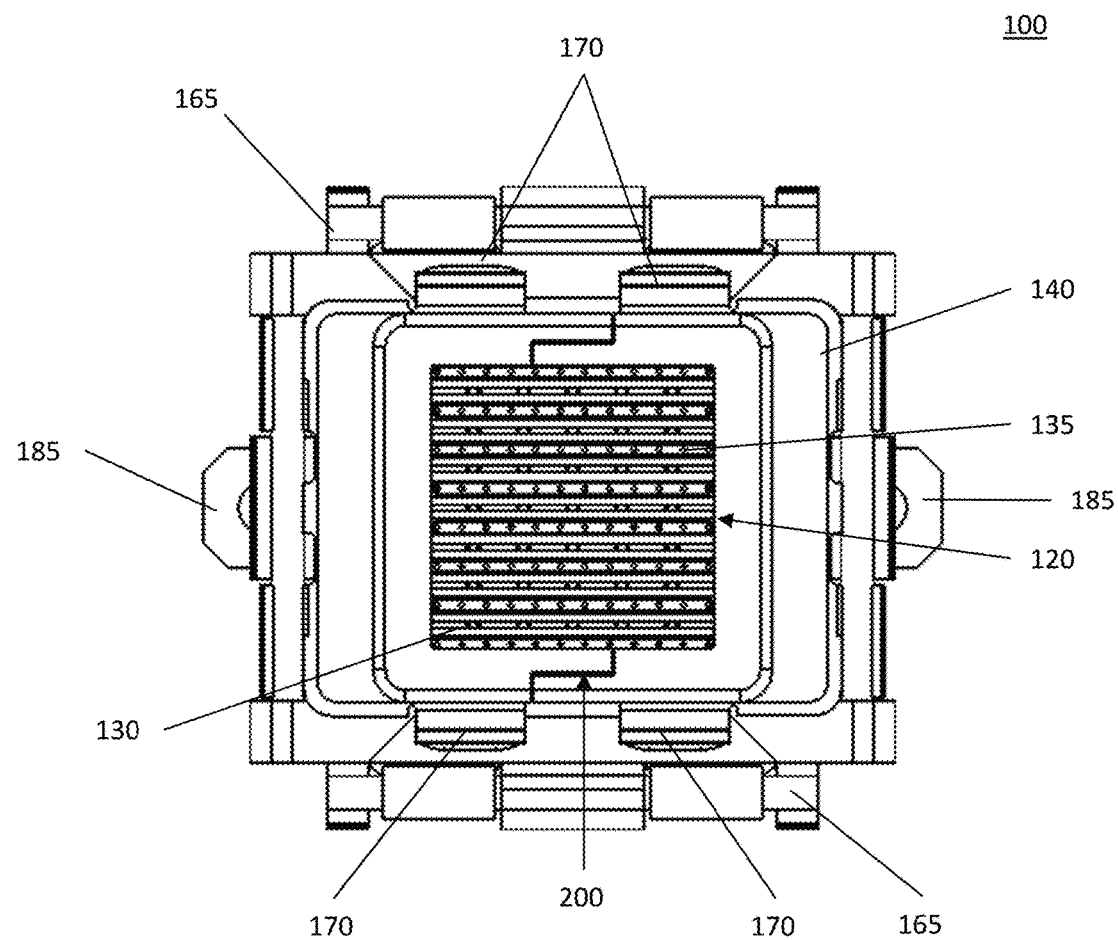
FIG. 6 shows an end view of the adapter of FIG. 1-FIG. 5.

Referring to FIG. 6, an end view of the adapter 100 is shown. The end view of adapter 100 illustrates a first set of ganged ferrules 120 having multiple ferrules 130 containing a plurality of optical fibers 135 therein. As the ferrules 130 are held in place by the lids 145, 150, 155, 160 in the closed position, the ferrules 130 may be secured within the adapter body 105, thereby preventing disconnection of the optical fibers. The lids 145, 150, 155, 160 may have an offset profile 200, thereby allowing the lids 145, 150, 155, 160 to substantially engage and close without overlapping.

Figure 7:
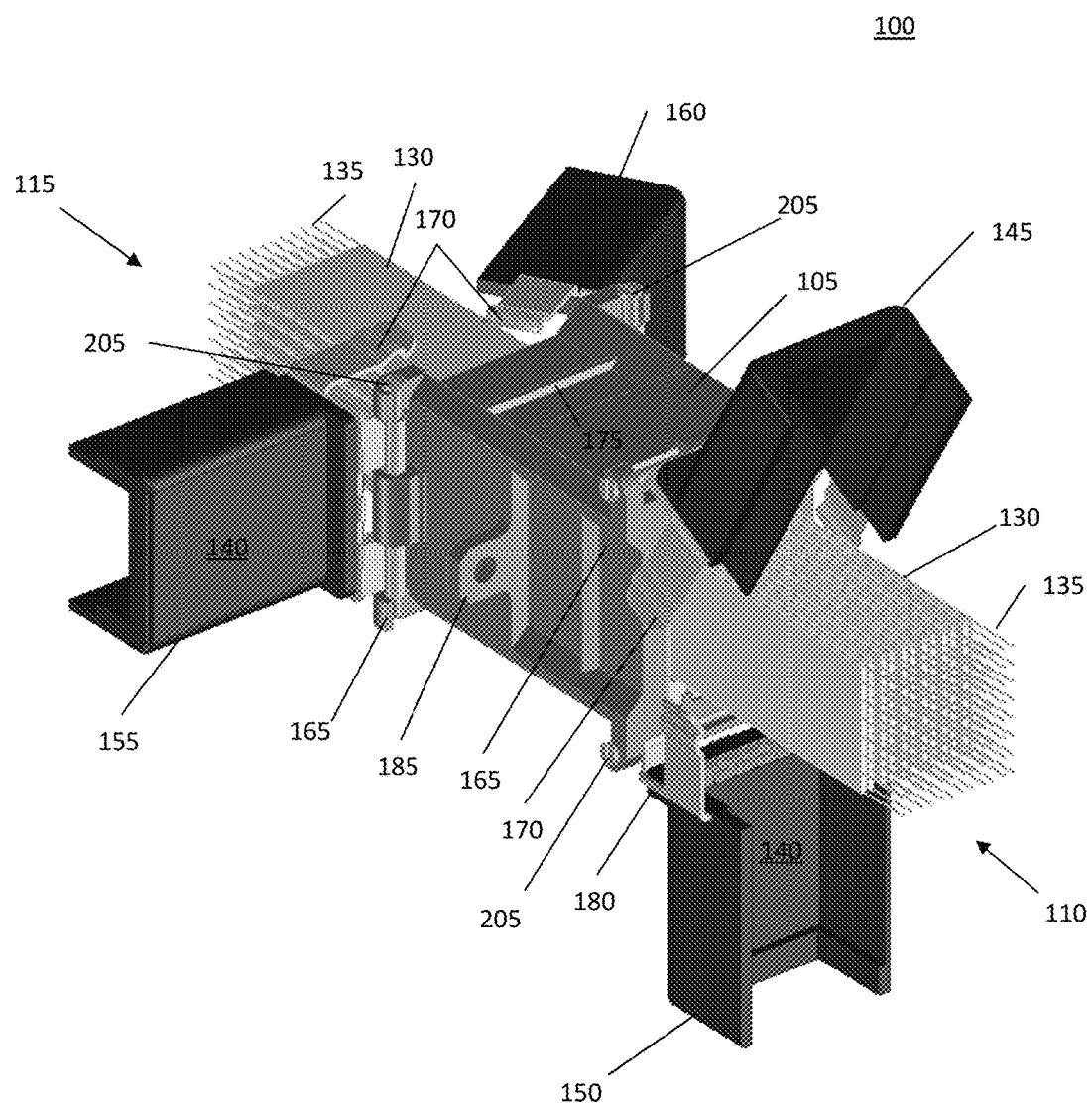
FIG. 7 shows a perspective view of the adapter of FIG. 1-FIG. 6.

Referring to FIG. 7, a perspective view of the adapter 100 is shown. In this embodiment, pivot points 165 may further include one or more securing pins 205. The securing pins 205, which may include screw pins, allow for the pivot point 165 to be secured in place, thereby preventing the closure members 140 from being opened without first unsecuring the securing pins 205. In one embodiment, a securing pin 205 may include a screw that radially expands at the pivot point 165 to prevent the closure members 140 from rotating about pivot point. Securing pin 205 may also include a screw style pin that compresses a pivot point member (not shown) longitudinally or latitudinally, thereby preventing the closure members 140 from rotating about pivot point 165. Accordingly, closing members 140 are compressed and held against adapter body 105.

In certain embodiments, the apertures in the closure members 140 that receive the securing pin 205 may be threaded, thereby allowing the securing pin 205 to be tightened by turning the securing pin 205 relative to the apertures of the closure members 140. In certain embodiments, the securing pin 205 may be inserted in one side of pivot point 165 and a nut (not shown) or other mechanical mating surface disposed on the opposite side of pivot point 165. As securing pin 165 or nut is tightened relative to one another, inward pressure is applied on the adapter body 105 to prevent the closure members 140 from pivoting about the pivot point 165. In other embodiments, securing pin 205 may be a clevis pin, a hinge pin stop, a pin lock, a dowel pin, or any other type of securing member that prevents the closure members 140 from pivoting about pivot point 165.

Figure 8:
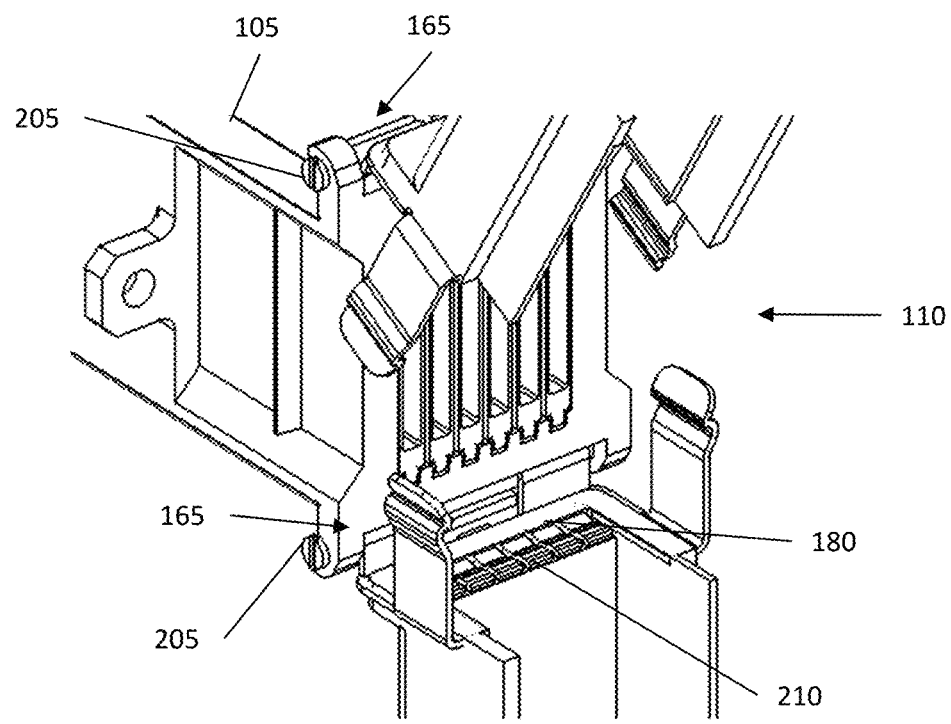
FIG. 8 shows a close perspective view of the adapter of FIG. 1-FIG. 6 and FIG. 7.

Referring to FIG. 8, a close perspective view of the adapter 100 is shown. In this embodiment a first end 110 of an adapter body 105 of an adapter 100 is shown in the open position. As discussed above, the adapter 100 includes a securing pin 205 disposed on the pivot point 165 where closure members 140 are connected to the adapter body. In this embodiment, in addition to a base 180 providing a positive force against the ferrules 130, shown in FIG. 7, during assembly, one or more spring fingers 210 may further provide a positive force holding the ferrules 130 in place.

The spring fingers 210 may include one or more protrusions formed from metals, plastics, composites, or the like, that provide a spring force against the ferrules 130 when the adapter 100 is in a closed position. In this embodiment, there are multiple spring fingers 210, such that there is one spring finger 210 for each ferrule 130, as shown in FIG. 7, however, in other embodiments, a single spring finger 210 the length of the inside of adapter body 105 may be used, or multiple spring fingers 210 may be disposed that do not correspond to the number of ferrules 130.

Figure 9:
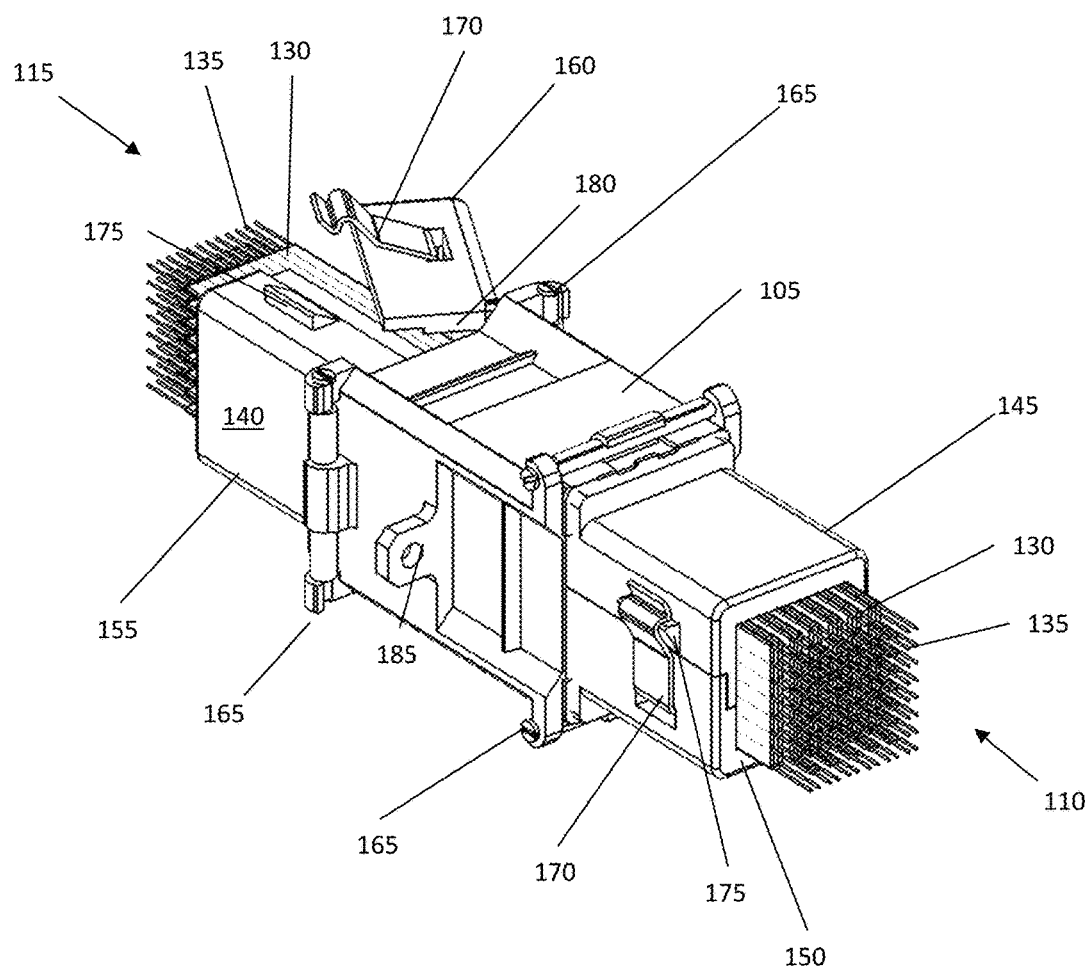
FIG. 9 shows a perspective view of an adapter with one closure member in an open position and one closure member in a closed position in accordance with one or more embodiments.

Referring to FIG. 9, a perspective view of the adapter 100 with one closure member 140 in an open position and one closure member 140 in a closed position. In this embodiment, one of the two opposing closure members 140 on one of the opposing ends 110, 115 may include a locking mechanism, such as a retention clip 170, while the opposing closure member 140 includes a retention surface 175. The retention clips 170 and retention surfaces 175 may include the variants described above with respect to FIG. 1.

For example, first lid 145 may include a retention clip 170 while the second lid 150 includes a retention surface 175. Similarly, a third lid 155 may include a retention clip 170, while the fourth lid 160 includes a retention surface 175. Thus, as the closure members 140 are rotated about pivot point 165, the closure members 140 may be rotated into a closed position and locked into the closed position. In certain embodiments, adapter body 105 may also have retention surfaces 175, thereby allowing different types of closure members 140 to be used therewith. For example, in certain embodiments, one set of opposing closure members 140 may lock into a closed position by engaging members of the closure members 140 with features of the adapter body 105, while the second set of opposing closure members may lock into a closed position by engaging members of the closure members 140. Those of ordinary skill in the art having the benefit of this disclosure will appreciate that variations on the location of retention clips 170 and retention surfaces 175 relative to the adapter body 105 and closure members 140 are within the scope of the present disclosure.

In this embodiment, pivot points 165 may further include one or more securing pins 205 (as illustrated in FIG. 8) to provide an additional locking mechanism. Additionally, when in the closed position, the base 180 may provide a positive force on one or more ferrules 130 holding one or more optical fibers 135. The positive force applied by the base 180 to the ferrules 130 may thereby hold the ferrules 130 in place when the adapter 100 is in the closed position. The force may be applied due to the locking of one or both of the closure members to one another or locking the adapter into the closed position through use of the securing pin 205. Additionally, when in the closed position, the base 180 may provide a positive force on one or more ferrules 130 holding one or more optical fibers 135. The positive force applied by the base 180 to the ferrules 130 may thereby hold the ferrules 130 in place when the adapter 100 is in the closed position.

Figure 10:
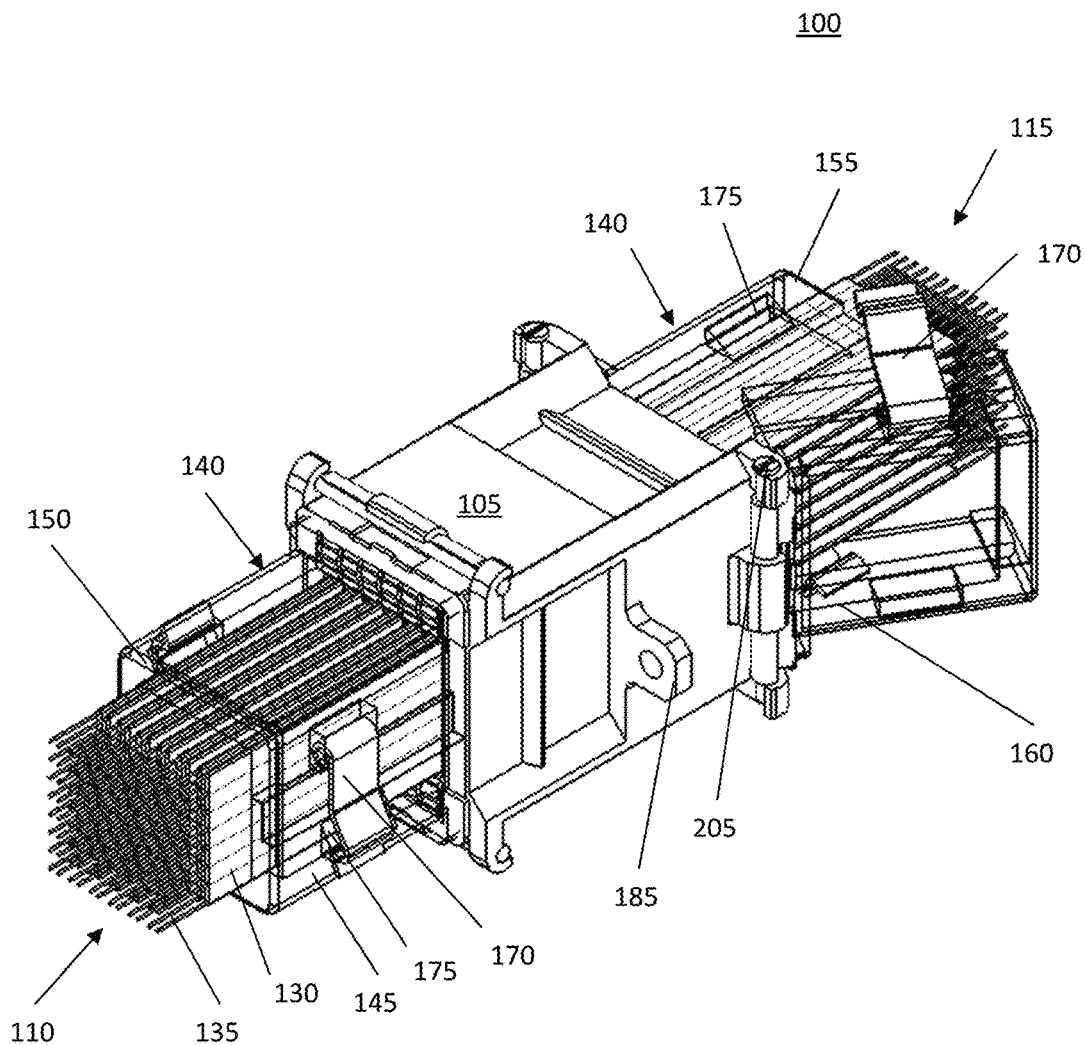
FIG. 10 shows a cut away perspective view of the adapter of FIG. 9 with one closure member in an open position and one closure member in a closed position.

Referring to FIG. 10, a partially transparent perspective view of an adapter 100 with the closure members 140 on the first end 110 shown in the closed position while the closure members 140 of the second end 115 are shown in the open position. In this embodiment, one of the two opposing closure members 140 on one of the opposing ends 110, 115 may include a locking mechanism, such as a retention clip 170, while the opposing closure member 140 includes a retention surface 175. The retention clips 170 and retention surfaces 175 may include the variants described above with respect to FIG. 1. As can be seen from the transparent portion of the second end 115, both sides of closure members 140 may have corresponding locking mechanisms, such as corresponding retention clips 170 and retention surfaces 175.

Figure 11:
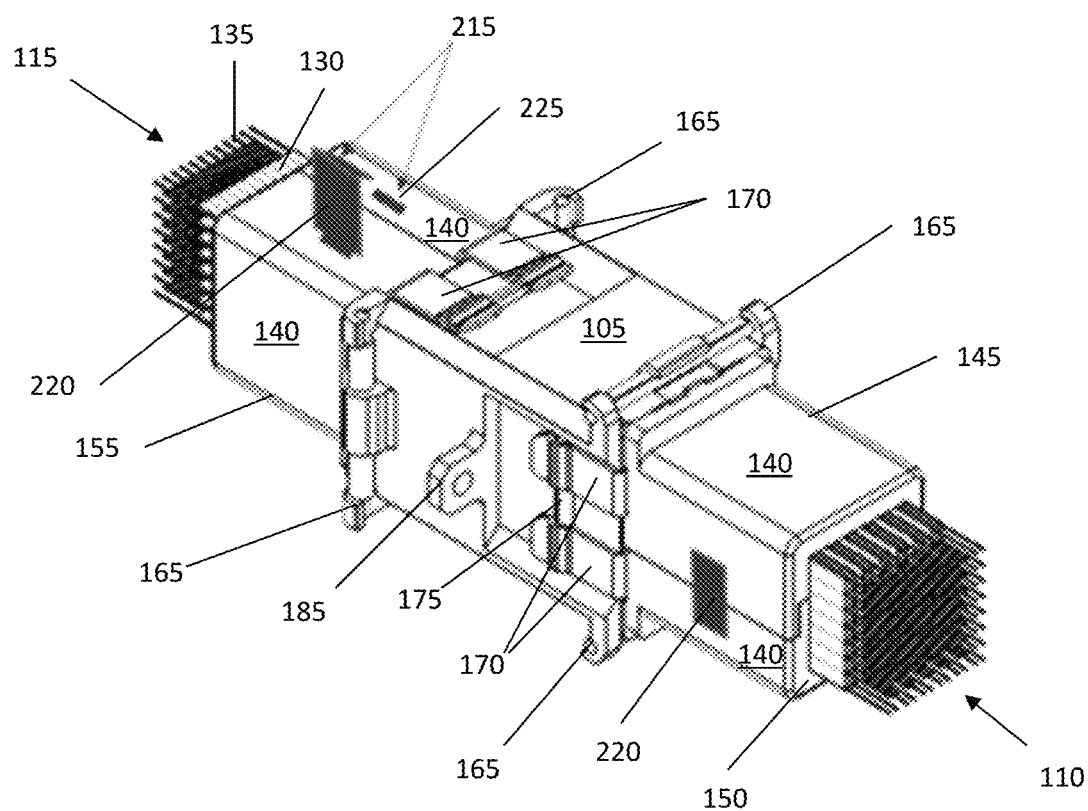
FIG. 11 shows a perspective view of an adapter having closure latches in accordance with one or more embodiments of the example embodiment.

Referring to FIG. 11, a perspective view of an adapter having closure latches in accordance with one or more embodiments of the example embodiment is shown. As illustrated in FIG. 11, adapter 100 includes an adapter body 105 having a first end 110 and a second end 115 and also having a retention surface 175 disposed or otherwise formed thereon. Adapter 100 further includes a plurality of closure members 140 including a first lid 145, a second lid 150, a third lid 155, and a fourth lid 160 pivotably connected to adapter body 105 at pivot points 165 to rotate from an open position like that shown in FIG. 1 into the closed position, as shown in FIG. 11.

When in the closed position, retention clips 170 of lids 145, 150, 155, 160 engage the retention surface 175 on adapter body 105. In this embodiment, the retention clips 170 may be pushed over the top of retention surface 175 and the retention surface 175 may prevent lids 145, 150, 155, 160 from retracting into the open position unless a positive force is applied to the ends of the retention clips 170. In other embodiments, positive forces may have to be applied to the top, side, or bottom of retention clips 170 in order to allow the lids 145, 150, 155, 160 to be retracted into the open position.

In addition to locking adapter 100 into a closed position through retention clips 170 and retention surfaces 175, adapter may further include one or more closure latches 215. In such an embodiment, one of the two opposing closure members 140 may include a first latching surface 220 that is configured to engage a second latching surface 225, which is disposed on the other opposing closure member 140. Examples of first and second latching surfaces 220, 225 include a first latching surface 220 that pivots latitudinally about the closure member 140 and engages a second latching surface 225 that is statically disposed on the opposing closure member 140. Other closure latches 215 may include, for example, pin lock systems, ball lock systems, screws, clevis pins, as well as adhesives, either physical or chemical, such as hook and loop systems, glues, resins, epoxies, combinations thereof and the like.

Figure 12:
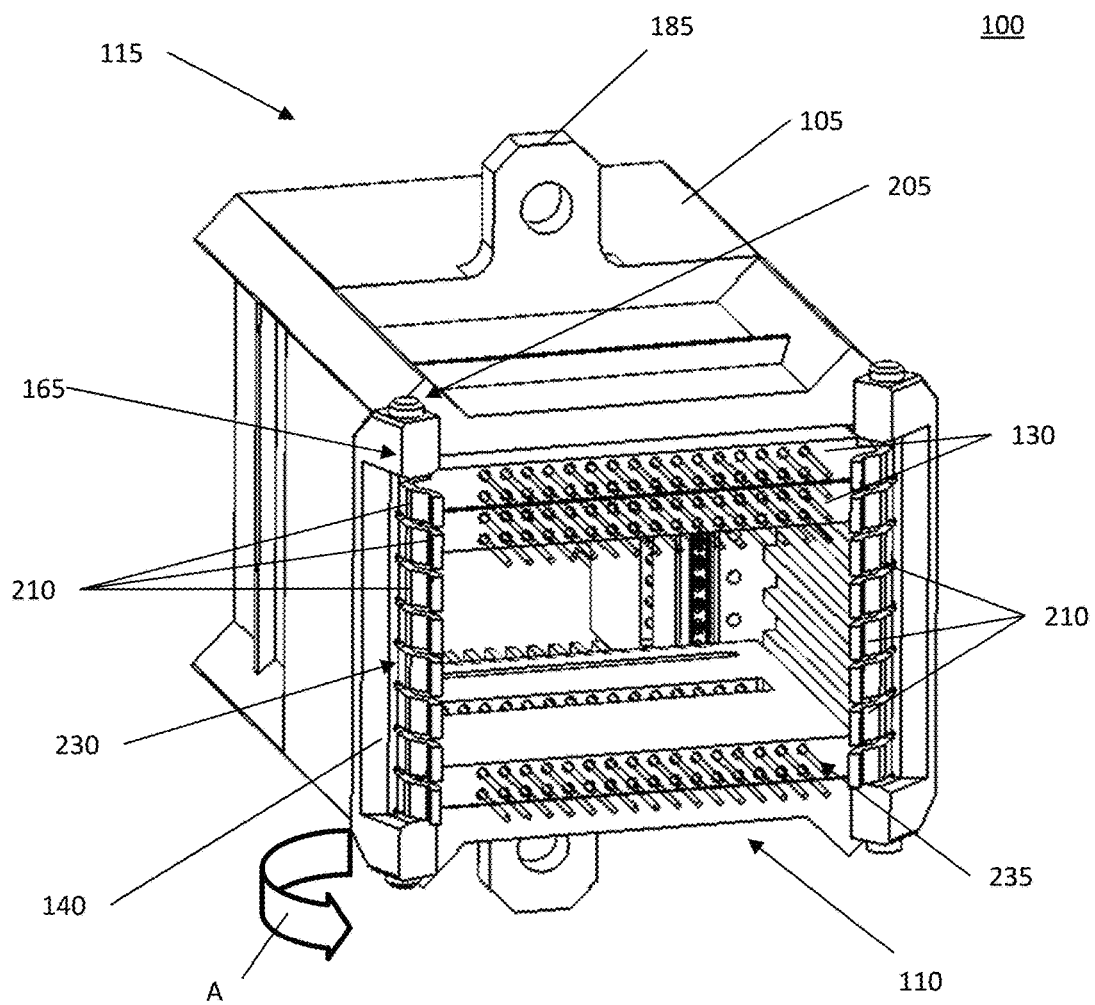
FIG. 12 shows a perspective end view of an adapter in an open position in accordance with one or more embodiments of the example embodiment.

Referring to FIG. 12, a perspective end view of an adapter 100 in an open position in accordance with one or more embodiments of the example embodiment is shown. In this embodiment, an adapter 100 includes an adapter body 105 having a first end 110 and a second end 115. Adapter 100 further includes a first pair of closure members 140 on the first end 110, with a second pair of closure members (not shown) on the second end 115. For the purposes of this disclosure, the first and second closure members are substantially the same.

Figure 13:
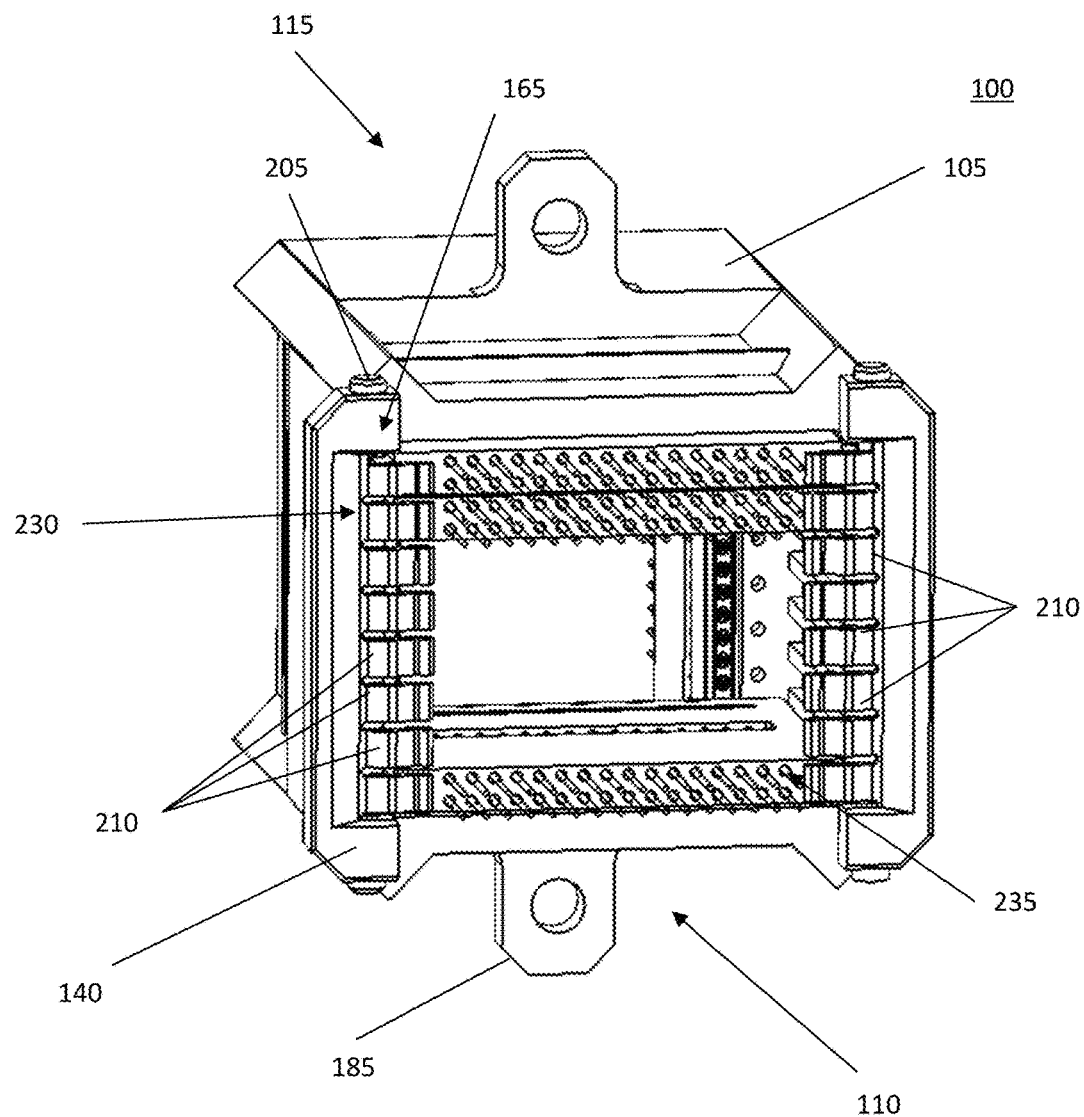
FIG. 13 shows a perspective end view of the adapter of FIG. 12 in a closed position in accordance with one or more embodiments of the example embodiment.

The closure members 140 are pivotably connected to adapter body 105 and are configured to rotate in Direction A from an open position into a closed position (FIG. 13). Each closure member 140 includes one or more locking mechanisms 230 that are configured to engage a set of ganged ferrules 235 when in a closed position. For clarity, a first pair of closure members 140 are pivotably connected to the first end 110 of the adapter body 105 about pivot points 165. The first pair of closure members 140 have first and second locking mechanism 230 that engage a first set 120 of ganged ferrules 130. Similarly, but not explicitly illustrated, a second pair of closure members are pivotably connected to the second end 115 of the adapter body 105 and pivot about corresponding pivot points 165. The second pair of closure members have third and fourth locking mechanisms that engage a second set of ganged ferrules.

In certain embodiments, the locking mechanisms 230 may include one or more spring fingers 210, such as those described above. The spring fingers 210 may provide a positive force on the ferrules 130, thereby holding them in place when the adapter is in the closed position. In one embodiments a spring finger 210 may be provided for each of the ferrules 130, while in other embodiments a single spring finger 210 may be provided, or a number of spring fingers 210 that does not directly correlate to the number of ferrules. Additionally, the number of spring fingers 210 may differ with respect to the first pair of closure members and the second pair of closure members.

Additionally, one or more of the pivot points may include a securing pin 205. The securing pins 205, which may include screw pins, allow for the pivot point 165 to be secured in place, thereby preventing the closure members 140 from being opened without first unsecuring the securing pins 205. In one embodiment, a securing pin 205 may include a screw that radially expands at the pivot point 165 to prevent the closure members 140 from rotating about pivot point. Securing pin 205 may also include a screw style pin that compresses a pivot point member (not shown) longitudinally or latitudinally, thereby preventing the closure members 140 from rotating about pivot point 165. In certain embodiments, the apertures in the closure members 140 that receive the securing pin 205 may be threated, thereby allowing the securing pin 205 to be tightened by turning the securing pin 205 relative to the apertures of the closure members 140. In other embodiments, securing pin 205 may be a clevis pin, a hinge pin stop, a pin lock, a dowel pin, or any other type of securing member that prevents the closure members 140 from pivoting about pivot point 165.

Referring to FIG. 13, a perspective end view of an adapter in a closed position in accordance with one or more embodiments of the example embodiment is shown. As with FIG. 12, the adapter of FIG. 13, shown in the closed position, may include securing pins 205 and mounting features 185, which are discussed in detail above. The securing pints 205 may be tightened once in the closed position, thereby preventing the closure members 140 from opening until the securing pins 205 are loosened into an unsecure position. In addition to holding closure members 140 in a closed position when lightened, the securing pins 205 may provide an additional positive force against the ferrules 130 by preventing spring fingers 210 from backing out of contact with the ferrules 130.

Referring generally to the embodiments discussed in detail through FIGS. 1-13 above, the example embodiments may provide methods to retain ganged ferrules within an adapter. To retain the ganged ferrules, a user may first connect a first set of ganged ferrules to a first side of the adapter. The connecting may include pushing or sliding the ganged ferrules into the adapter body along ferrule guides of by using alignment features thereby securing the ganged ferrules within the adapter body. After the first set of ganged ferrules is connected a user may connected a second set of ganged ferrules to the second side of the adapter using the same procedure as described for the first.

After one or both sets of ganged ferrules are connected within the adapter body the corresponding closure members may be rotated from the open position. For example, after both sets of ganged ferrules are connected the first and second closure members along with the third and fourth closure members may be rotated from the open to the closed position. In other operational procedures, the first set of ganged ferrules may be connected, at which point the first and second closure members are rotated from the open position to the closed position. After the first set is in a closed position the second set of ganged ferrules may be connected and the third and fourth closure members rotated from the open to closed position. Those of ordinary skill in the art will appreciate that the ferrules may be connected in any order the user prefers.

When in the closed position, the closure members apply a force on the first and second set of ganged ferrules, thereby holding the ferrules in place, preventing accidental disconnection of the fiber optic connection. In certain embodiments, the closure members may be secured in the closed position by engaging locking mechanisms of the closure members to either opposing closure members or between a closure member and the adapter body. In still other embodiments, a spring finger of the closure member may be engaged with one or more of the first and second set of ganged ferrules. The engagement may thereby apply a force on the ganged ferrules that hold them in place when the adapter is in the closed position.

In certain embodiments, a securing pin may be actuated between a locked and unlocked condition, wherein actuating to securing pin into a locked position prevents the closure members from rotating back to an open position until the securing pin is unlocked. Also, in certain embodiments, a mounting feature on the adapter body may be used to mount the adapter to a housing or mechanical frame using for example, a bracket system, a faceplate, a shelf on a rack, or on railing. The mounting feature may also be used to conjoin multiple adapters to one another. In such an embodiment, the adapters may be cascaded together, thereby allowing multiple adapters to be secured together within a system.

In addition to rotating the closure members between open and closed positions, latches may be used to lock or otherwise secure the closure members in the closed position. Latches and other locking mechanisms may be used to secure a closure member to an adapter body, a closure member to another closure member, or combinations thereof.

Characteristics of one or more implementations of the example embodiments may include one or more of the following.

In one or more embodiments of the example embodiment, an adapter retention mechanism may be used to secure sets of ganged ferrules within an adapter.

In one or more embodiments of the example embodiment, a closure member of an adapter may be used to secure sets of ganged ferrules within an adapter.

In one or more embodiments of the example embodiment, an adapter may include one or more securing pins to lock an adapter in either a closed or open position.

In one or more embodiments of the example embodiment, an adapter may include one or more locking mechanism to secure closure members to the body of an adapter retention mechanism.

In one or more embodiments of the example embodiment, an adapter may include one or more locking mechanism to secure closure members to one another.

In one or more embodiments of the example embodiment, an adapter may include one or more locking mechanism to secure closure members to one another and locking mechanism to secure closure members to the body of an adapter retention mechanism.

In one or more embodiments of the example embodiment, mounting features of an adapter may be used to secure the adapter within a mechanical housing, such as within a system.

In one or more embodiments of the example embodiment, mounting features of an adapter may be used to secure multiple adapters to one another, thereby allowing for the cascading of adapters within a system.

In one or more embodiments of the example embodiment, members of an adapter may be used to provide a positive force, a retention force, on a set of ferrules, thereby holding the ferrules in place when the adapter is in a closed position.

In one or more embodiments, the example embodiment may provide an inexpensive system for holding sets of ganged ferrules within adapter.

In one or more embodiments, the example embodiment may provide systems and methods for quickly connecting and disconnecting sets of ganged ferrules within an adapter while still maintaining the integrity of the adapter when the adapter is in the closed position.

In one or more embodiments, the example embodiment may provide retention features on an adapter that may hold multiple ferrules installed from both sides of the adapter while providing mechanical force for reliable optical signal connectivity.

Those in the art having the benefit of this disclosure will also appreciate that various embodiments may also employ permutations of these specific characteristics. For example, the following permutations set forth below are within the scope of the protection sought as well as permutations not expressly set forth or shown in the drawings.

In one or more embodiments of the example embodiment, an adapter retention mechanism may be used to secure sets of ganged ferrules within an adapter using closure members with or without one or more securing pins to lock an adapter in either a closed or open position.

In one or more embodiments of the example embodiment, an adapter retention mechanism may be used to secure sets of ganged ferrules within an adapter using closure members and including locking mechanism to secure the closure members to the body of the adapter retention mechanism with or without locking mechanism to secure the closure members to one another.

While the example embodiment has been described with respect to the above-noted embodiments, those skilled in the art, having the benefit of this disclosure, will recognize that other embodiments may be devised that are within the scope of the subject matter claimed below as disclosed herein. Accordingly, the scope of the protection sought should be limited only by the appended claims.

What is claimed is:

1. An adapter retention mechanism comprising:
    an adapter body having a first end and a second end, the first and second ends accepting first and second sets of ganged ferrules in use;
    a first pair of closure members pivotably connected to the first end of the adapter body, the first pair of closure members comprising first and second locking mechanisms, the first pair of closure members being configured to engage the first set of ganged ferrules; and
    a second pair of closure members pivotably connected to the second end of the adapter body, the second pair of closure members comprising third and fourth locking mechanisms, the second pair of closure members being configured to engage the second set of ganged ferrules.

2. The adapter retention mechanism of claim 1, wherein any of the locking mechanisms comprise at least one spring finger.

3. The adapter retention mechanism of claim 1, further comprising at least one securing pin to secure movement of at least one of the first and second pair of closure members.

4. The adapter retention mechanism of claim 1, wherein any one of the closure members comprise a closure latch.

5. The adapter retention mechanism of claim 1, wherein the first and second pairs of closure members are configured to rotate about the adapter body between an open position and a closed position and wherein in the closed position the first pair of closure members is configured to apply a retention force on the first set of ganged ferrules.

6. The adapter retention mechanism of claim 1, wherein the first and second pairs of closure members are configured to rotate about the adapter body between an open position and a closed position and wherein in the closed position the first and second locking mechanisms are configured to apply a retention force on the first set of ganged ferrules and the third and fourth locking mechanisms are configured to apply a retention force on the second set of ganged ferrules.

7. The adapter retention mechanism of claim 1, further comprising at least one mounting feature disposed on the adapter body.

8. The adapter retention mechanism of claim 7, wherein the at least one mounting feature is configured to engage a mounting feature of another adapter retention mechanism.

9. An adapter retention mechanism comprising:
an adapter body having a first end and a second end;
a first lid connected to the first end of the adapter body;
a second lid connected to the first end of the adapter body;
a third lid connected to the second end of the adapter body; and
a fourth lid connected to the second end of the adapter body,
wherein each of the first, second, third, and fourth lids comprises two opposing retention clips and a base.

10. The adapter retention mechanism of claim 9, wherein the base is configured to apply a force on at least one ferrule comprising at least one optical fiber.

11. The adapter retention mechanism of claim 9, wherein the respective bases are disposed on the first, second, third, and fourth lids proximate the adapter body.

12. The adapter retention mechanism of claim 9, wherein the first, second, third, and fourth lids are configured to pivot about the adapter body between an open position and a closed position.

13. The adapter retention mechanism of claim 9, wherein the adapter body further comprises at least one retention surface configured to engage at least one of the retention clips.

14. The adapter retention mechanism of claim 9, wherein at least one spring finger is disposed within at least one of the first, second, third, and fourth lid.

15. The adapter retention mechanism of claim 9, further comprising at least one mounting feature disposed on the adapter body.

16. The adapter retention mechanism of claim 15, wherein the at least one mounting feature is configured to engage a mounting feature of another adapter retention mechanism.

17. The adapter retention mechanism of claim 9, wherein the first lid is connected to a first side of the adapter body, the second lid is connected to a second side of the adapter body, the third lid is connected to a top side of the adapter body, and the fourth lid is connected to a basal side of the adapter body.

18. A method to retain ganged ferrules in an adapter, the method comprising:
connecting a first set of ganged ferrules to a first side of the adapter;
connecting a second set of ganged ferrules to a second side of the adapter; and
rotating a first, second, third, and fourth closure member of the adapter from an open position to a closed position, wherein the closed position of the first, second, third, and fourth closure members applies a force on the first and second set of ganged ferrules.

19. The method of claim 18, further comprising securing the first, second, third, and fourth closure members in the closed position by engaging a locking mechanism of the closure members to another locking mechanism disposed on the adapter body.

20. The method of claim 18, further comprising engaging a spring finger of the first, second, third, and fourth closure members with the first set and the second set of ganged ferrules, wherein the engaging applies a force on the first and second set of ganged ferrules.

* * * * *